(12) United States Patent
Tseng et al.

(10) Patent No.: US 8,053,913 B2
(45) Date of Patent: Nov. 8, 2011

(54) PHYSICAL ENERGY-CONVERTING ROTOR, ROTATING METHOD OF THE SAME AND GENERATING SET USING THE SAME

(75) Inventors: Kuang-Tai Tseng, Taipei Hsien (TW); Kuo-Kang Chen, Taipei (TW); Chih-Che Lin, Taipei (TW)

(73) Assignee: Rosace International Co., Ltd., Taipei (TW)

( * ) Notice: Subject to any disclaimer, the term of this patent is extended or adjusted under 35 U.S.C. 154(b) by 456 days.

(21) Appl. No.: 12/417,185

(22) Filed: Apr. 2, 2009

(65) Prior Publication Data

US 2010/0253091 A1    Oct. 7, 2010

(51) Int. Cl.
*H02K 7/18*        (2006.01)
(52) U.S. Cl. .......................................... 290/1 R; 310/81
(58) Field of Classification Search ............... 310/81; 290/1 R
See application file for complete search history.

(56) References Cited

U.S. PATENT DOCUMENTS

| | | | | |
|---|---|---|---|---|
| 1,785,965 A | * | 12/1930 | Major | 307/84 |
| 3,562,567 A | * | 2/1971 | Carini | 310/83 |
| 4,521,167 A | * | 6/1985 | Cavalleri et al. | 418/82 |
| 5,387,818 A | * | 2/1995 | Leibowitz | 290/1 R |
| 7,944,069 B2 | * | 5/2011 | Uchiyama | 290/44 |
| 2008/0150294 A1 | * | 6/2008 | Jones | 290/55 |
| 2010/0133838 A1 | * | 6/2010 | Borgen | 290/52 |

* cited by examiner

*Primary Examiner* — Thanh Lam
(74) *Attorney, Agent, or Firm* — Rabin & Berdo, P.C.

(57) ABSTRACT

A physical energy-converting rotor has a rotor body and multiple weights. When the rotor body is rotated, an inner virtual orbit and an outer virtual orbit are formed and the weights are rotated. The weights are moved back and forth between the inner and outer virtual orbits to form non-balances to keep the rotor body rotating. The physical energy-converting rotor may operate alone, or may cooperate with non-pollution generators such as wind generators and water generators to enhance power-generating effect.

24 Claims, 18 Drawing Sheets

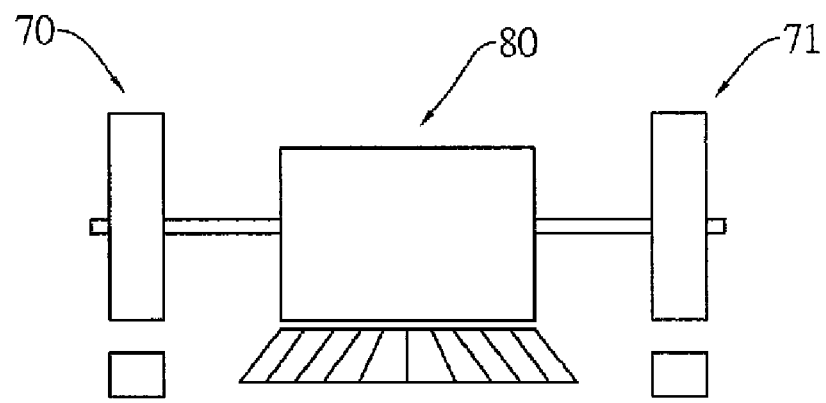
FIG.8A
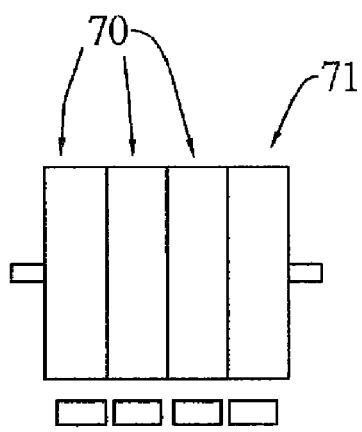 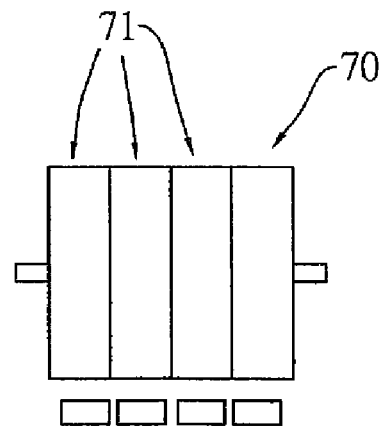
FIG.8B  FIG.8C

PHYSICAL ENERGY-CONVERTING ROTOR, ROTATING METHOD OF THE SAME AND GENERATING SET USING THE SAME

BACKGROUND OF THE INVENTION

1. Field of the Invention

The present invention relates to a physical energy-converting rotor, especially to a rotor that generates energy with a force action-at-distance.

2. Description of the Prior Arts

For supplying modern life needs, energy consumption is steadily increasing. Presently, chemical-energy conversion is used to generate energy. Among the chemical-energy conversion methods, thermal power generation and nuclear power generation. However, generating power by fossil-fuel combustion using thermal energy for power generation produces large amounts of polluted air so causes air pollution and environmental effects related to global warming. Nuclear power generation has concerns regarding radioactivity. Alternative power generation, such as by wind, wave, and solar energy are regarded as non-polluting energy, but energy conversion rates are too low and unreliable to be a major power resource.

Therefore, gaining large amounts of energy without polluting is very important.

SUMMARY OF THE INVENTION

The main objective of the present invention is to provide a physical energy-converting rotor that use magnetic force and gravity to generate energy. The present invention may also cooperate with wind power-generation, hydro-power-generation and the like to increase energy conversion rates and operating-sustainability.

The present invention has a rotor body and multiple weights. The weights may be, but are not limited to high density fluids and solids. Movements of the weights between inner and outer annular tracks of the rotor body maintain continuous rotation of the rotor body for a long time. The weights may be mounted in the rotor body, or be mounted outside the rotor body to increase a moment of inertia. Gravity forces the weights to move between the inner and outer annular tracks of the rotor body back and forth so that the rotating force for the rotor body is provided. When the rotor body has longer radius or the density of the weight is larger, the moment of inertia of the rotor is larger to keep the rotor body rotating longer and also to save the energy.

Furthermore, when centrifugal force and gravity of the weights are equal, the weights stop moving. Therefore, the weights may be made of magnetic or magnet-conductivity materials so that the weights are moved by magnetic force to increase rotating speed of the rotor body.

The physical energy-converting rotor of the present invention may operate by itself to generate power, multiple rotors may be connected to generate power, or at least one rotor may be connected to a wind-, hydro- or wave-power generator to enhance generating effect and to prolong operation. Therefore, the present invention provides a non-polluting energy generator.

Other objectives, advantages and novel features of the invention will become more apparent from the following detailed description when taken in conjunction with the accompanying drawings.

BRIEF DESCRIPTION OF THE DRAWINGS

FIGS. 8A to 8C are sketch views of generating sets in accordance with the present invention with the rotors in FIGS. 5A to 6;

DETAILED DESCRIPTION OF THE PREFERRED EMBODIMENTS

Principle

Figure 1:
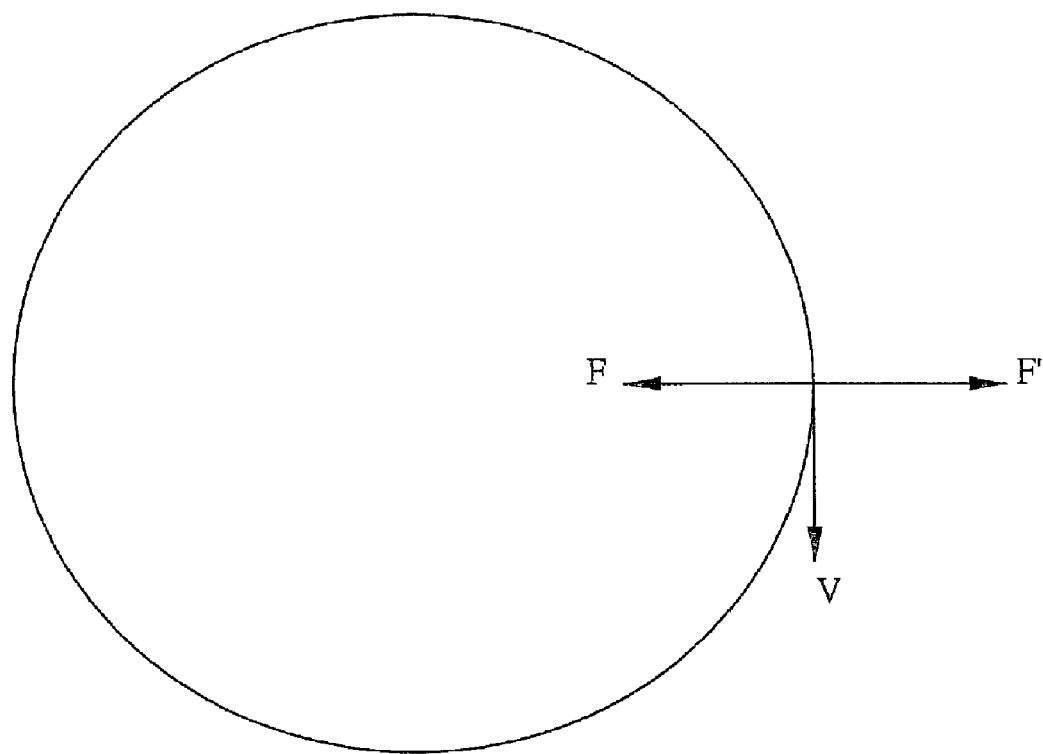
FIG. 1 is a mathematical model of circular motion.

With reference to FIG. 1, when an object performs circular movement, the object has a tangential velocity (V). A centripetal force (F) and a centrifugal force (F') for the object are equal and have different directions. The centripetal force (F) is in direct ratio with the mass (m), the tangential velocity (V) and the radius (R) of the object, but is in inverse ratio with the period (T). The angular velocity (Vω) maintains constant, but the tangential velocity (V) varies with the radius (R) per the following formulae.

$$F_1 = m \times R_1 \times V\omega^2$$

$$F_2 = m \times R_2 \times V\omega^2$$

$$F_2 - F_1 = m \times (R_2 - R_1) \times V\omega^2$$

or $$F_1 = m \times 2 \times \pi \times V_1 / T$$

$$F_2 = m \times 2 \times \pi \times V_2 / T$$

$$F_2 - F_1 = m \times 2 \times \pi \times (V_2 - V_1) / T$$

Figure 2:
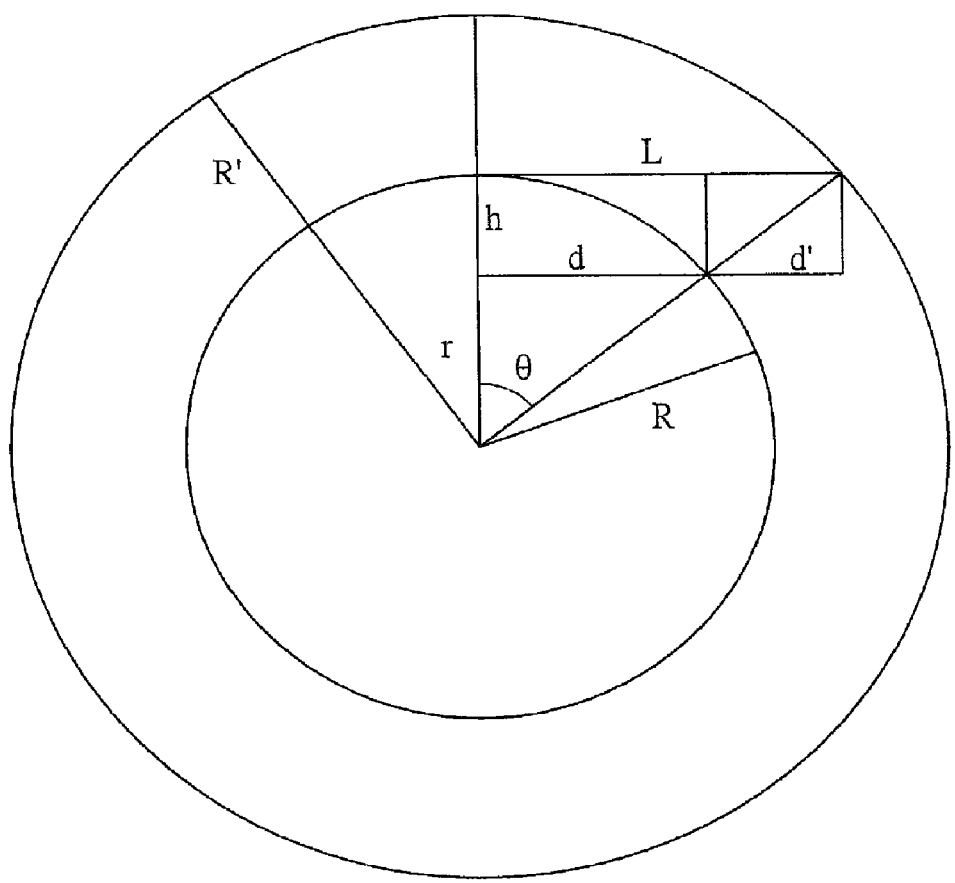
FIG. 2 is a sketch of a perpendicular rotor in accordance with the present invention.
Figure 3:
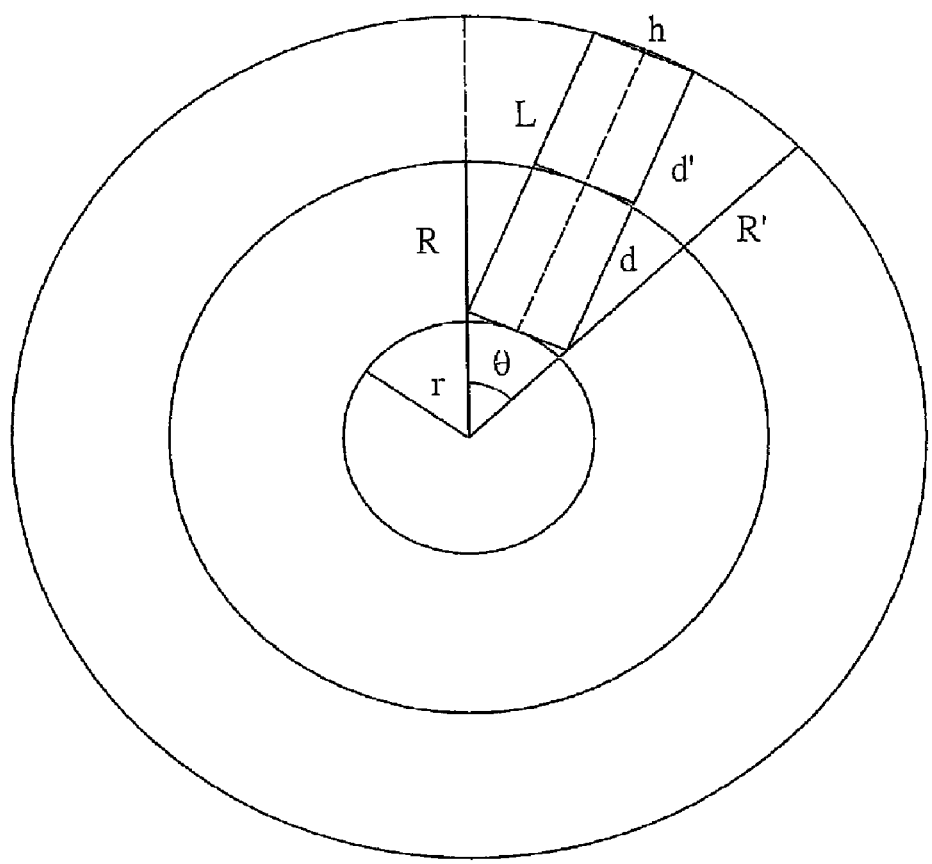
FIG. 3 is a sketch of a parallel rotor in accordance with the present invention.

With further reference to FIGS. 2 and 3, a rotor in accordance with the present invention has an inner virtual orbit and an outer virtual orbit. Multiple hollow columns are mounted between the inner and outer virtual orbits and weights are mounted on the hollow columns. When the rotor is rotated, the weights move back and forth due to gravity.

With reference to FIG. 2, the columns are perpendicular to the radius of the rotor. The inner virtual orbit has a radius (R). The outer virtual orbit has a radius (R'). Distance (r) is between the center of the rotor and a bottom of the column. The column has a mounted angle (Θ), a height (h) or a diameter (h), a length (L) and a width (w). Distance (d) is between the column and an edge of the inner virtual orbit. Distance (d') is between the column and an edge of the outer virtual orbit. "N" represents number of columns in the rotor. Foregoing dimensions are related by following formulae.

$$r = R \cos \theta$$

$$d = R \sin \theta$$

$$h = R - r$$

$$\theta = 360/N$$

$$d' = h = w$$

$$r = R' \times L \cos \theta = R' \sin \theta = d + d'$$

Therefore, more columns increase volume of the rotor and volume and mass of the weights are determined.

With further reference to FIG. 3, the columns are parallel to the radius of the rotor. The mounting angle of each column may be between 0 and 90 degrees.

Figure 4A:
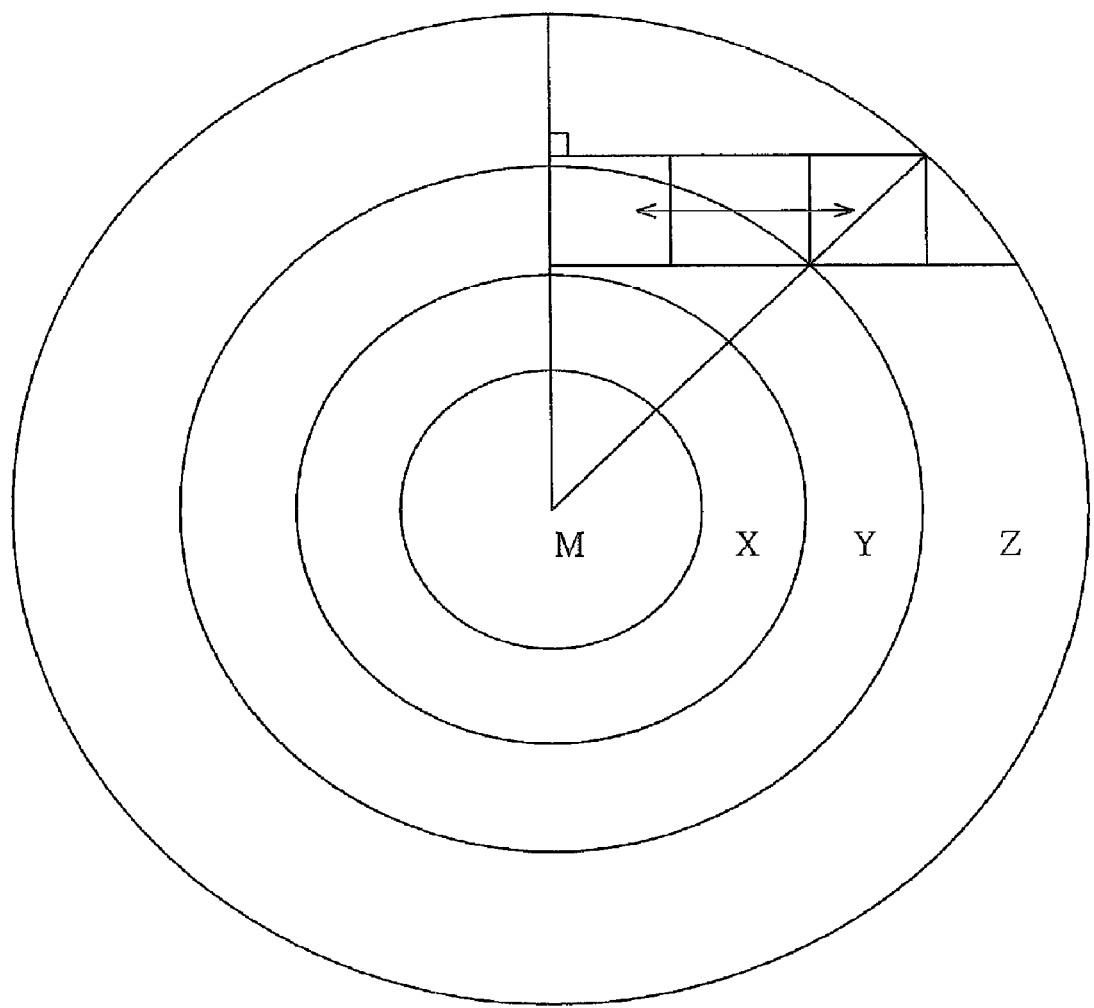
FIG. 4A is a mathematical model of the perpendicular rotor in FIG. 2.
Figure 4B:
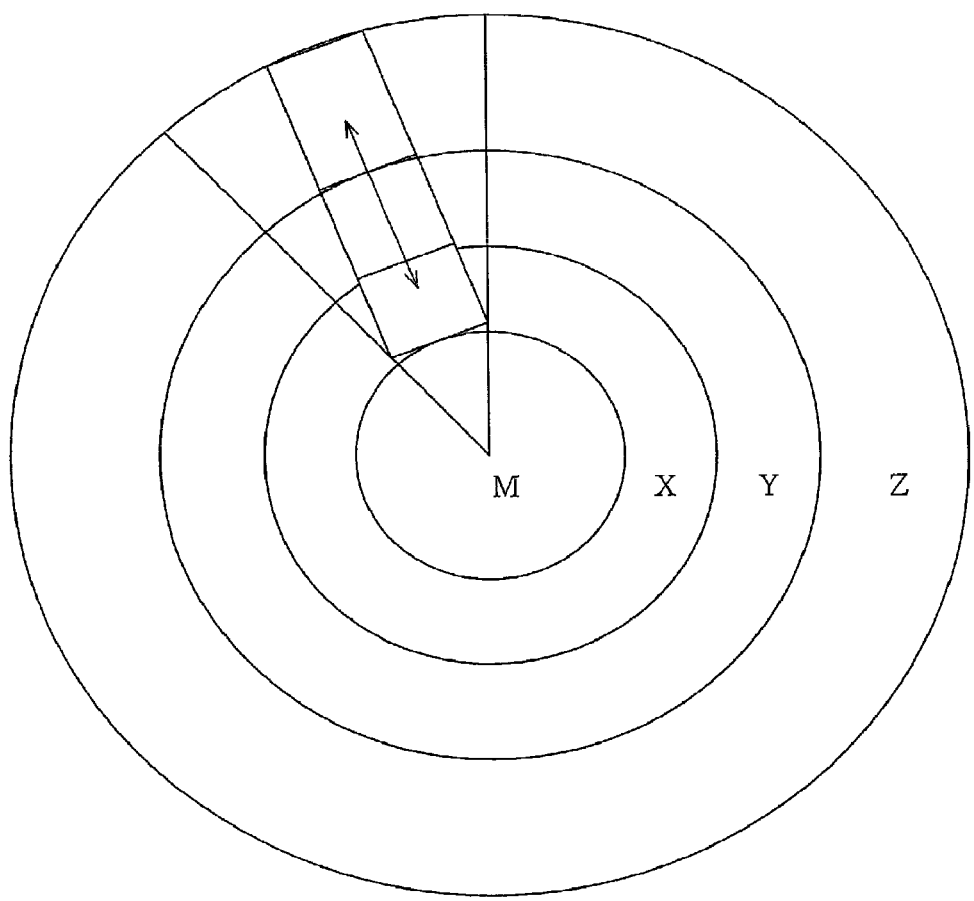
FIG. 4B is a mathematical model of the parallel rotor in FIG. 3.

With further reference to FIGS. 4A and 4B, the weights may be solid or liquid. "X" represents inner virtual orbit, "Y" represents middle virtual orbit, "Z" represents outer virtual orbit and M represents a center of the rotor. When the columns are parallel to the radius of the rotor, the weights move back and forth along a path Y to Z. When the columns are perpendicular to the radius of the rotor, the weights move back and forth along the path X to Z. The radius of the outer virtual orbit (Z) is larger than the radius of the inner virtual orbit (X) to increase the rotation radius. The virtual orbits (X, Y, Z) may be in the rotor, or may be out of the rotor to increase torque.

EXAMPLE

The rotor in accordance with the present invention may be implemented in multiple embodiments that include gravitational rotors, magnetic levitation rotors and gravitational-magnetic rotors. The embodiments of the rotor in accordance with the present invention may operate alone or multiple rotors may be connected in series to generate power as desired.

Figure 14:
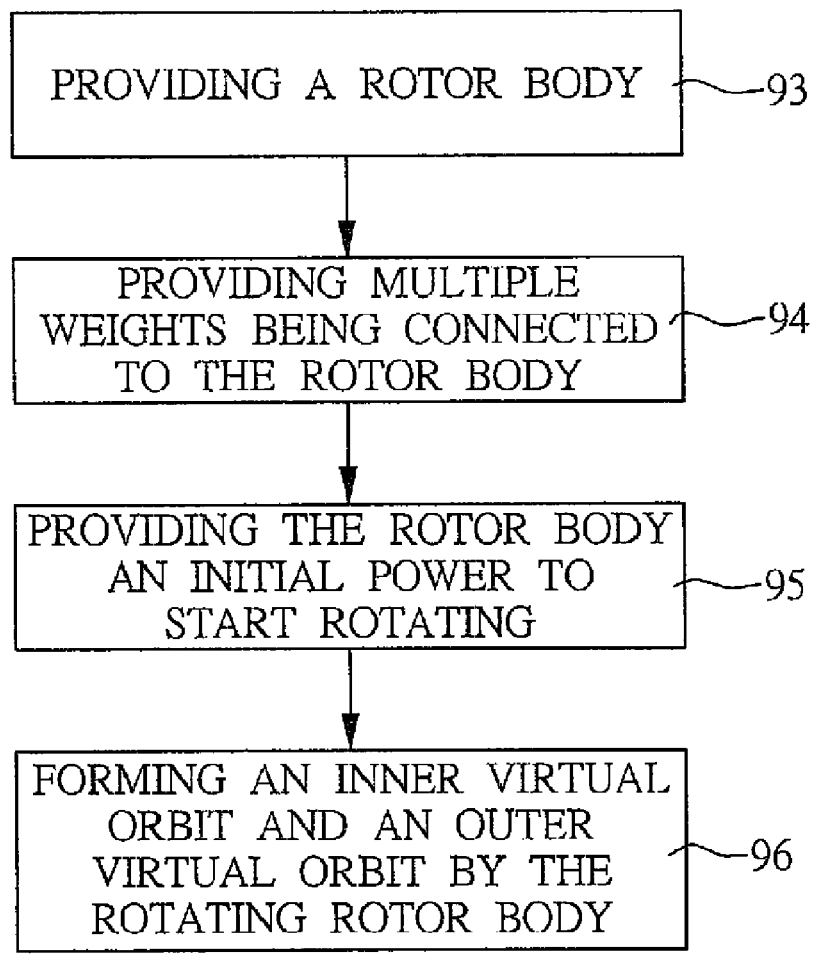
FIG. 14 is a diagram of a rotating method for a physical energy-converting rotor in accordance with the present invention.

With further reference to FIG. 14, a rotating method for a physical energy-converting rotor in accordance with the present invention comprises acts of:

providing a rotor body (93);

providing multiple weights being connected to the rotor body (94);

providing the rotor body an initial power to start rotating (95); and forming an inner virtual orbit and an outer virtual orbit by the rotating rotor body (96).

Figure 5A:
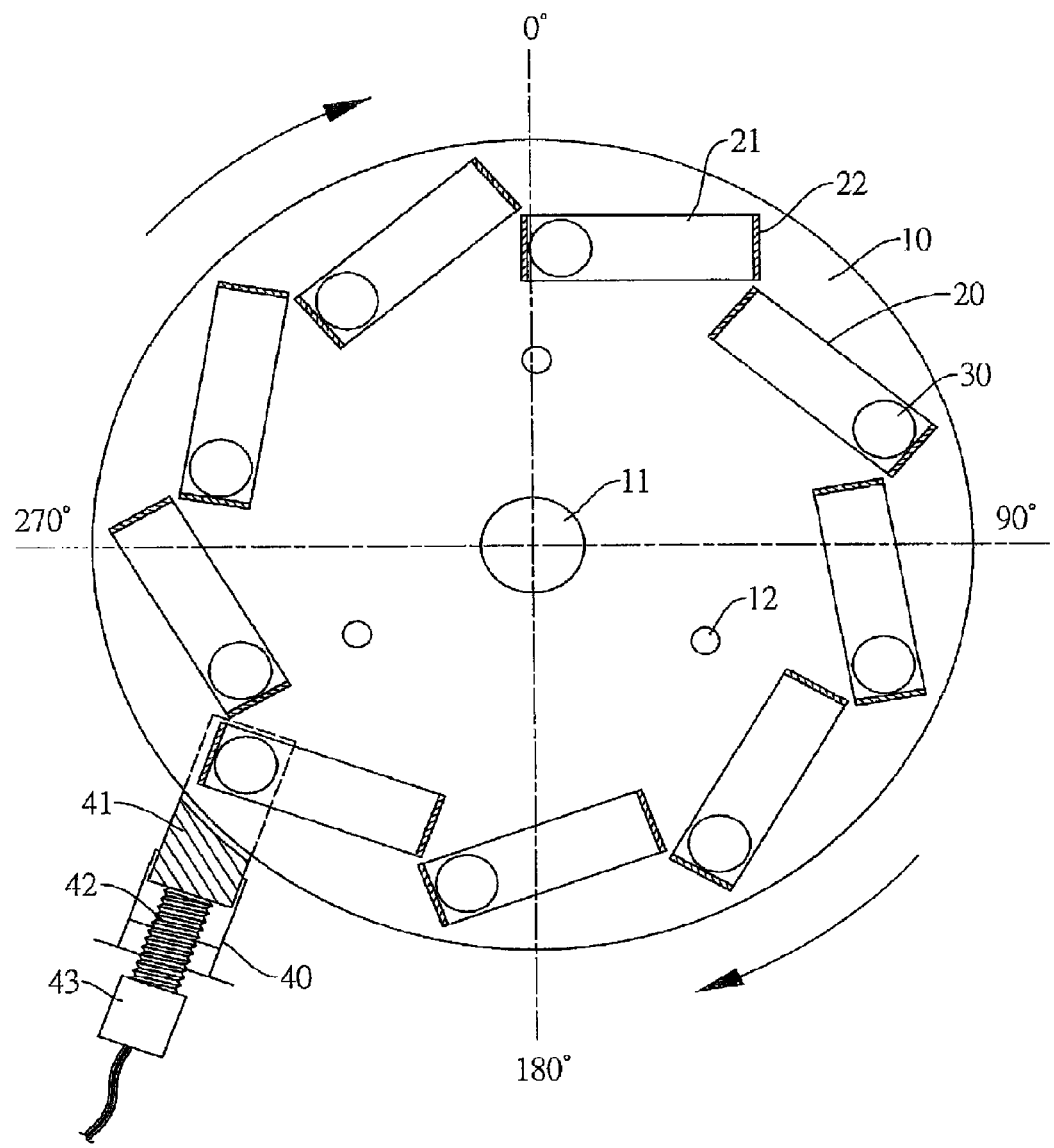
FIG. 5A is a front view in partial section of a perpendicular-gravitational rotor in accordance with the present invention.

With reference to FIG. 5A, a perpendicular gravitational rotor in accordance with the present invention has a rotor body (10), multiple columns (20), multiple weights (30) and an actuating assembly. The rotor body (10) is disk-like and has a shaft (11) and multiple fastening holes (12). The shaft (11) is mounted through a center of the rotor body (10). The fastening holes (12) are formed through the rotor body (10) so that the fasteners may be mounted through the fastening holes (12) to connect multiple rotor bodies (10). The columns (20) are mounted in the rotor body (10) along the edge of the rotor body (10) and are perpendicular with the radius of the rotor body (10). Each column (20) is hollow and has an inner cavity (21) and two buffering pads (22). The buffering pads (22) are mounted in the cavity (21) of the column (20) at two ends to prevent damage. Each weight (30) is mounted movably in the cavity (21) of a corresponding column (20), may metal or a permanent magnet and may selectively bump into the buffering pads (22). Optionally, the columns (20) may have buffering liquid inside to protect the weights (30). The actuating assembly has an actuating magnet (41). A motor mount (40) is mounted near an outer edge of the rotor body (10). An adjusting screw (42) is mounted through the motor mount (40). An actuating magnet (41) and a motor (43) respectively connect to two ends of the adjusting screw (42). The actuating magnet (41) is adjacent to the outer edge of the rotor body (10). Operating the motor (43) and adjusting the adjusting screw (42) changes a distance between the actuating magnet (41) and the rotor body (10) so that magnetic force the actuating magnet (41) exerts on the weights (30) is also changed.

When the rotor body (10) performs a circular movement, the weights (30) are moved back and forth in the columns (20) because of gravity. When the rotor body (10) is rotated clockwise, the weights (30) in the columns (20) that pass 0 degrees are moved from the inner virtual orbit to the outer virtual orbit to keep the rotor body (10) rotating clockwise. The actuating magnet (41) is mounted between 180 to 270 degrees relative to. When a column (20) is rotated near the actuating magnet (41), the weight (30) in the column (20) is attracted by the actuating magnet (41) to resist gravity and move from the inner virtual orbit to the outer virtual orbit and to enhance centrifugal force. Therefore, the rotor body (10) is forced to rotate clockwise continuously. Alternatively, the rotor body (10) may be rotated counter-clockwise.

Figure 5B:
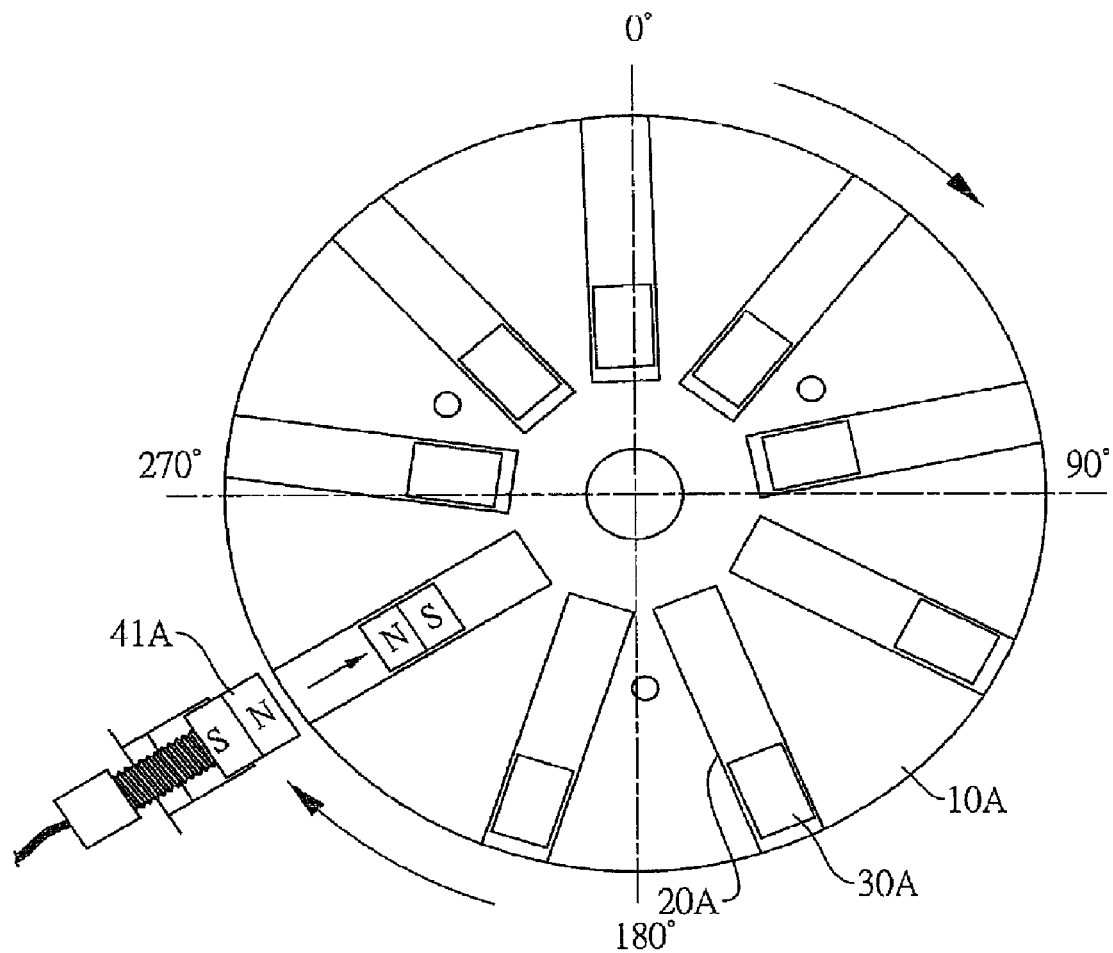
FIG. 5B is a front view in partial section of a parallel-gravitational rotor in accordance with the present invention.

With reference to FIG. 5B, a parallel gravitational rotor in accordance with the present invention is similar to the perpendicular gravitational rotor as described. The columns (20A) of the parallel gravitational rotor are parallel with the radius of the rotor body (10A). The weights (30A) of the parallel gravitational rotor are magnets. The parallel gravitational rotor may have multiple actuating assemblies so that the parallel gravitational may have multiple actuating magnets (41A). When the rotor body (10A) is rotated clockwise, the weights (30A) in the columns (20A) between 90 and 180 degrees are moved from the inner virtual orbit to the outer virtual orbit to keep the rotor body (10) rotating clockwise. The weights (30A) in the columns (20A) between 180 and 270 degrees are pushed by the actuating magnets (41A) to move from the outer virtual orbit to the inner virtual orbit. Because of principles of leverage, the rotor body (10A) is forced to rotate clockwise continuously. The rotor body (10) may also arrange to be rotated counter-clockwise.

To enhance the moment of inertia of the rotor body (10), an average density of the rotor body (10) must be smaller than the density of the weight (30). Therefore, the rotor body (10) is preferably hollow. Further, the mass of the rotor body (10) near the outer edge should be larger than the mass of the rotor body (10) near the center to increase the moment of inertia. The weights (30) moving in the columns (20) act like harmonic oscillators to limit power output and dampen speed changes.

The radius of the rotor body (10) may be changed to adjust the rotating speed of the gravitational rotor. The rotating speed of the gravitational rotor as described may be about 50 to 500 rpm. Moreover, operating the gravitational rotor as described is limited by gravity. Therefore, when gravity and centrifugal force for the weights (30) are equal, the weights (30) stop moving. After the weights (30) stop moving, the rotor body (10) is kept rotating by movement of inertia, or idling. Thus, the gravitational rotor as described is preferred to connect with wind- and hydro-generators to keep the generator to operating continually even without wind and water.

Figure 6:
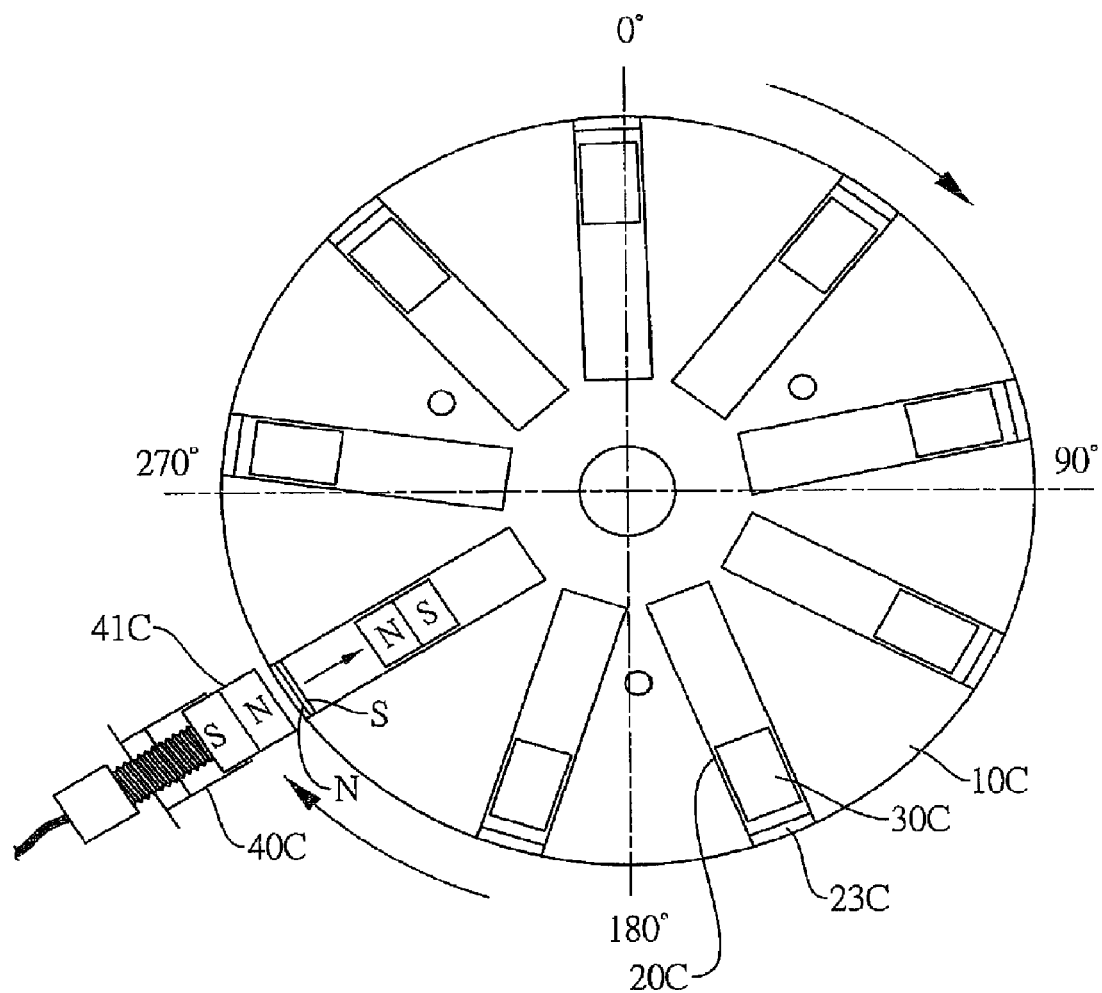
FIG. 6 is a front view in partial section of a magnetic levitation rotor in accordance with the present invention.

With reference to FIG. 6, a magnetic levitation rotor in accordance with the present invention has the columns (20C) being parallel with the radius of the rotor body (10C). Each column (20C) has a magnetic buffer (23C) being mounted on the outer end of the each column (20C). The magnet may be Samarium Cobalt or Neodymium Iron Boron and has a magnetic force 200 to 300 times the mass of itself. The weights (30C) are magnets and are attracted by the magnetic buffer (23C). Multiple actuating assemblies are mounted outside the rotor body (10C) between 0 and 270 degrees. When the rotor body (10C) is rotated clockwise, the weights (30C) in the columns (20C) corresponding to the actuating assemblies are repulsed by the actuating magnets (41C). Because of principles of leverage, the rotor body (10C) is forced to rotate clockwise continuously.

The magnetic levitation rotor as described rotates faster the gravitational rotor as described since the magnetic levitation rotor as described is rotated by the resistance between the centrifugal force and the magnetic repulsion. The rotating speed of the magnetic levitation rotor is determined by a number of the actuating magnets (41C). The magnetic levitation rotor as described provides rotating speeds over 1000 rpm and may be connected with the gravitational rotor as described to increase the rotating speed of the gravitational rotor.

Figure 7A:
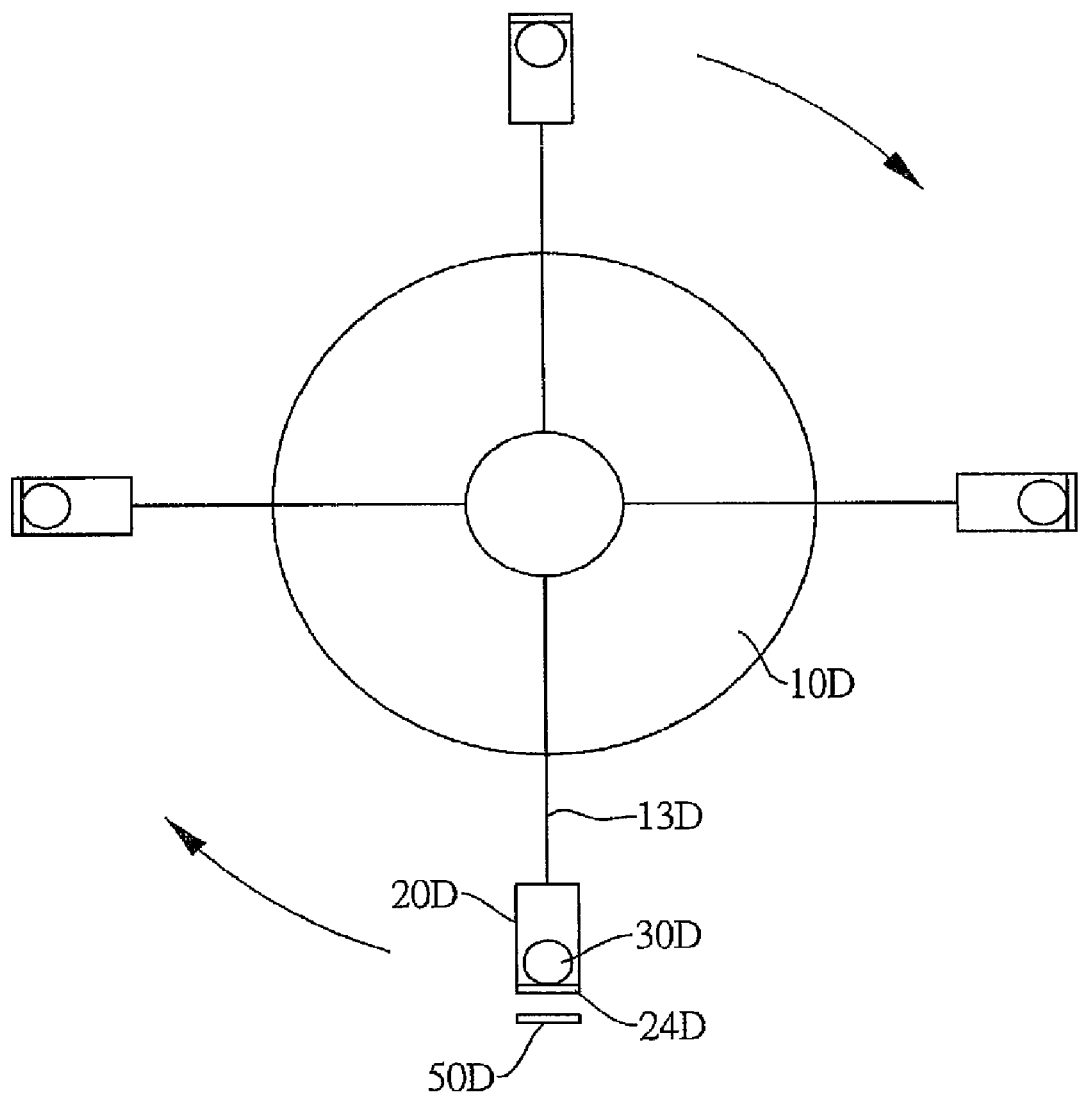
FIG. 7A is a front view of a parallel large rotor in accordance with the present invention
Figure 7B:
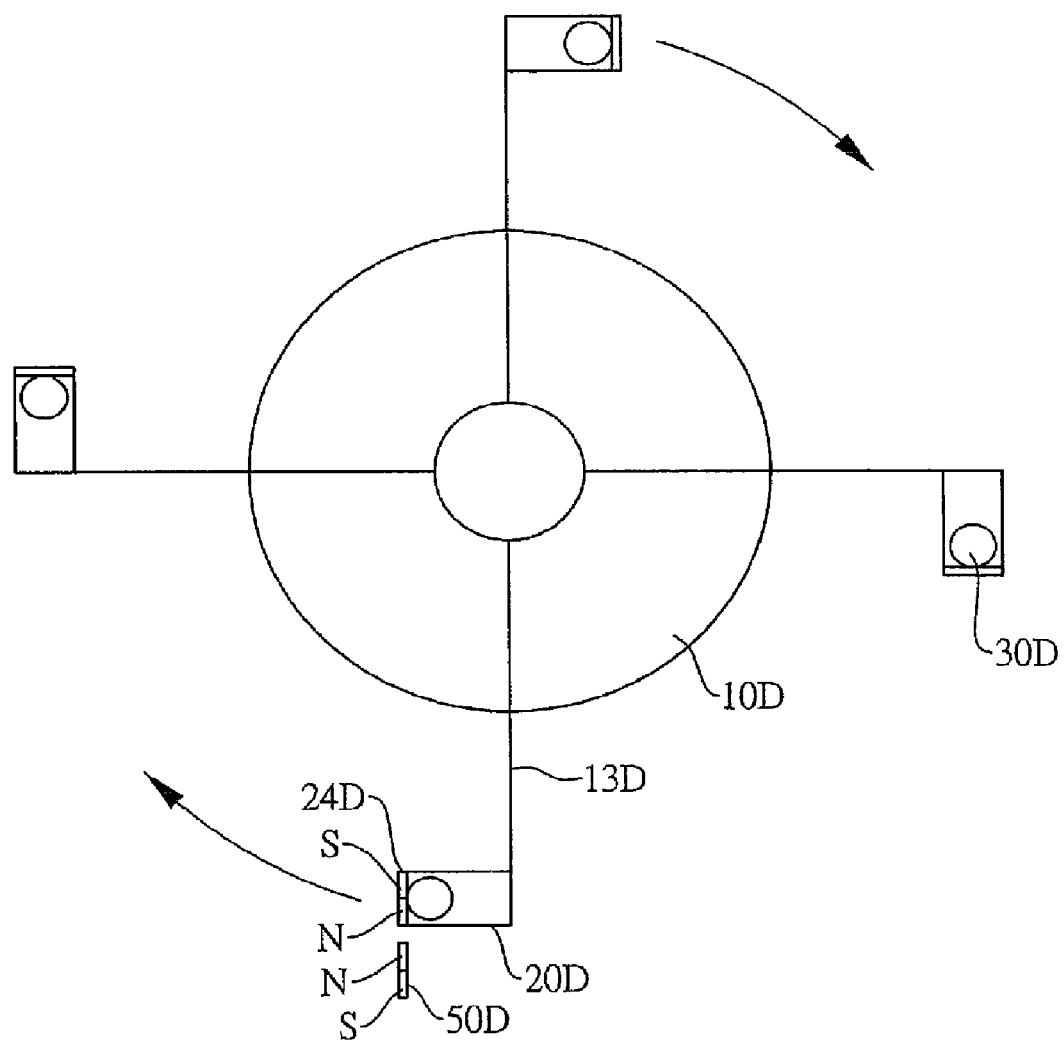
FIG. 7B is a front view of a perpendicular large rotor in accordance with the present invention.

With reference to FIGS. 7A and 7B, a large rotor in accordance with the present invention has multiple supports (13D) extending out of the rotor body (10D). Each column (20D) is attached securely to an end of a corresponding support (13D) and may be parallel or perpendicular with the support (13D). Each column (20D) has a magnetic buffer (24D) being mounted on the outer end of each column (20D). A stationary magnet (50D) is mounted outside the rotating track of the columns (20D). Because of the supports (13D), a moment of force for the rotor body (10D) to rotate is increased. Therefore, the rotary inertia of the larger rotor is increased and the rotor body (10D) can rotate for a longer time even with a smaller initial force. The stationary magnet (50D) may be mounted at any degrees around the rotating track of the columns (20D) and may have an included angle with the supports (13D) of 0 to 45 degrees. The rotating speed of the large rotor is lower and is between about 50 to 500 rpm so that the larger rotor is preferred to connect with a speed-change gear group to have greater generating effect.

Figure 8D:
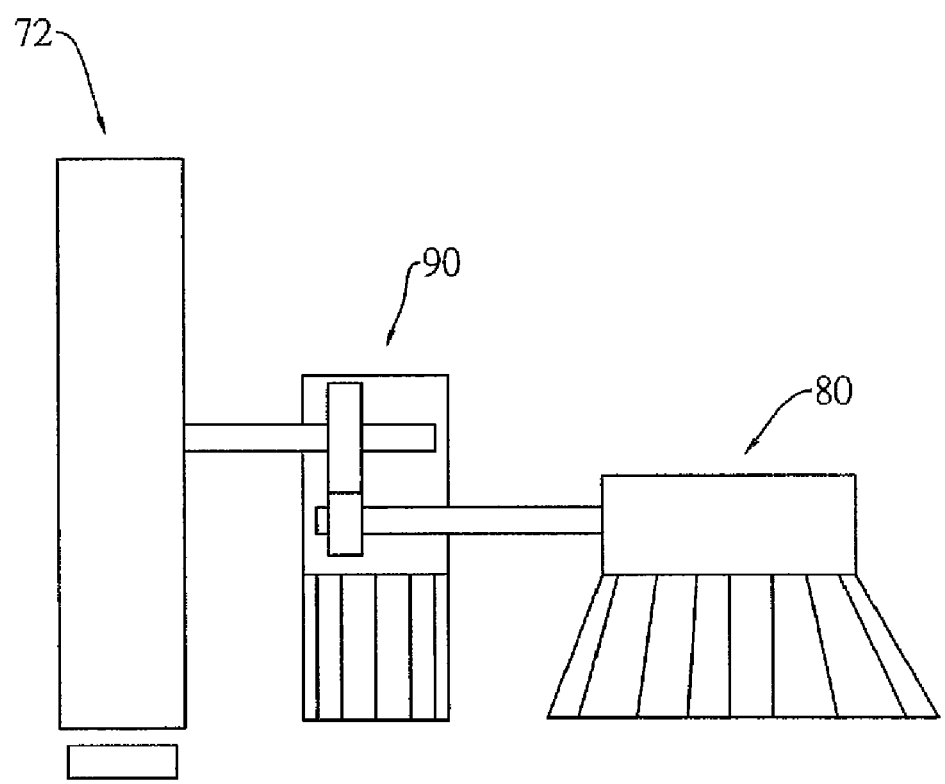
FIG. 8D is an operational view of a generating set with the rotors in FIGS. 7A and 7B.

With reference to FIG. 8, multiple generating sets in accordance with the present invention are shown. With reference to FIG. 8A, a gravitational rotor (70) as described and a magnetic levitation rotor (71) as described are connected to drive a generator (80). With reference to FIG. 8B, multiple gravitational rotors (70) as described and one magnetic levitation rotor (71) as described are connected to provide lower rotating speed and a higher torsion generating set. With reference to FIG. 8C, one gravitational rotor (70) as described and multiple magnetic levitation rotors (71) as described are connected to provide higher rotating speed and a lower torsion generating set. The gravitational rotor (70) provides idling rotation. With reference to FIG. 8D, a large rotor (72) as described is connected with a motor to provide an initial speed and a speed-change gear group to have greater generating effect.

Figure 9:
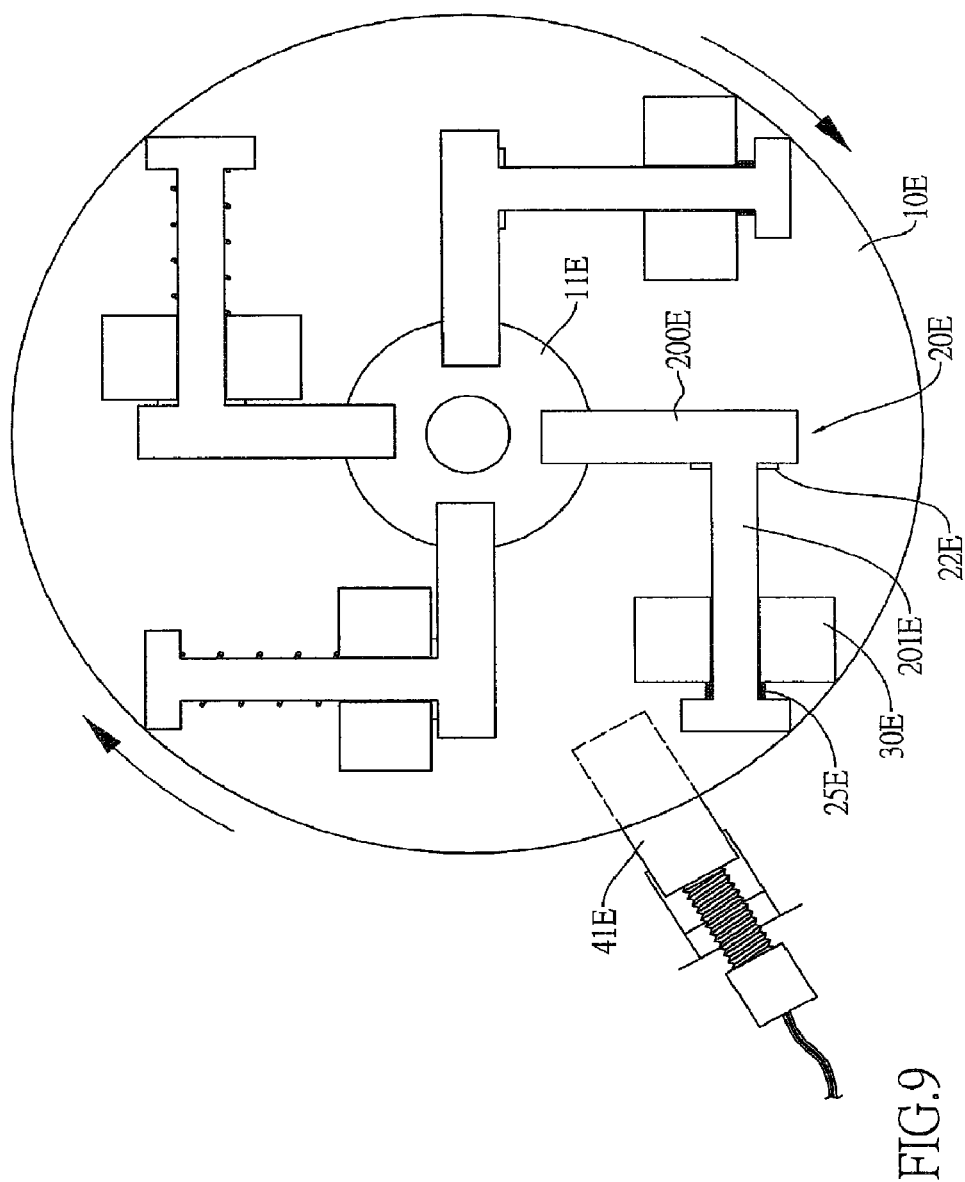
FIG. 9 is a front view in partial section of a track-gravitational rotor in accordance with the present invention.

With reference to FIG. 9, a track-gravitational rotor in accordance with the present invention has multiple solid columns (20E). Each column (20E) has a connecting column (200E) and a mounting column (201E) connecting to each other. The connecting columns (200E) protrude out of the rotor body (10E). The mounting column (201E) is perpendicular to the radius of the rotor body (10E). Each buffering pad (22E) is mounted securely around one end of a corresponding mounting column (201E). A spring (25E) is mounted around the other end of a corresponding mounting column (201E). Each weight (30E) is mounted slidably around a corresponding mounting column (201E) and abuts the spring (25E). When the rotor body (10E) is rotated, the weights (30E) slide along the mounting columns (201E) due to gravity. The actuating magnet (41E) is mounted outside the rotor body (10E) between 180 to 270 degrees to repulse the weights (30E) properly.

Figure 10:
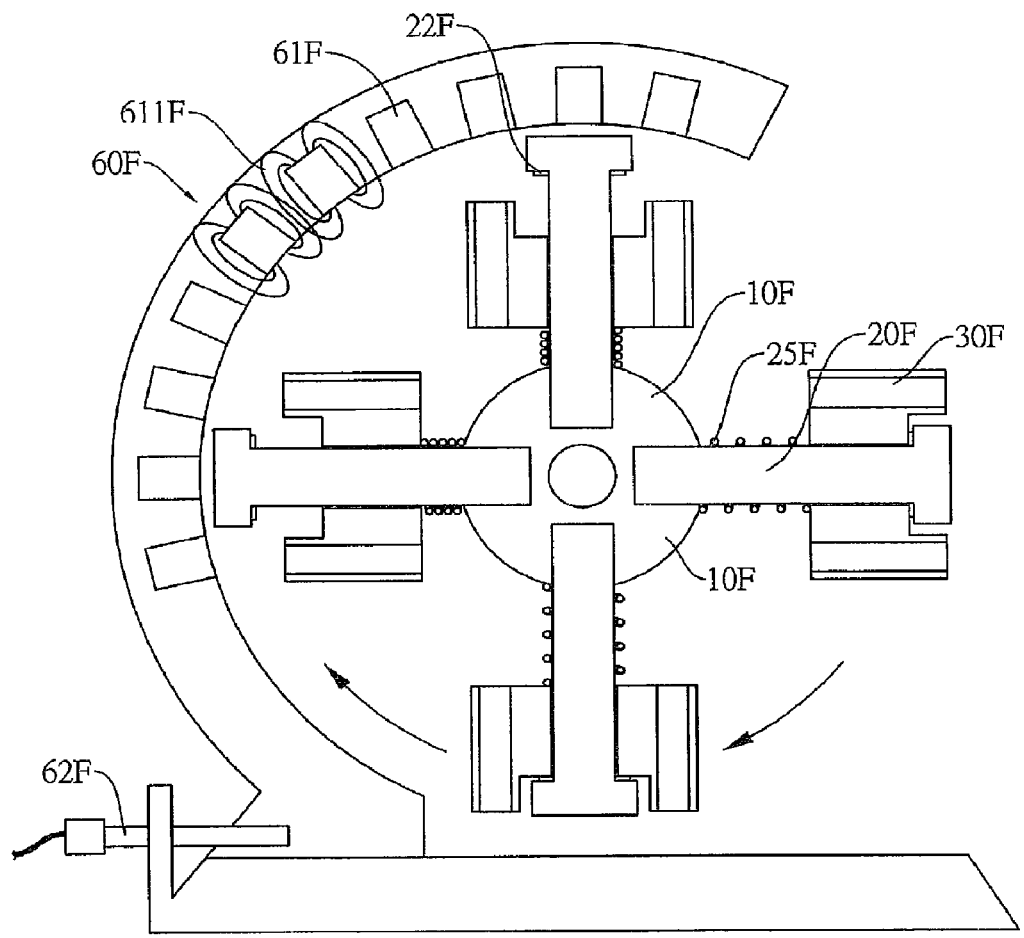
FIG. 10 is a front view in partial section of a track-magnetic levitation rotor in accordance with the present invention.

With reference to FIG. 10, a track-magnetic rotor in accordance with the present invention has multiple solid columns (20F) that extend out of the rotor body (10F). The columns (20F) are parallel with the radius of the rotor body (10F). Each column (20F) has a spring (25F) and a buffering pad (22F) being mounted respectively around two ends of the column (20F). A magnetic arc (60F) is mounted outside the columns (20F) and corresponds to part of the periphery of the rotor body (10F), such as 180 to 360 degrees. Multiple pushing magnets (61F) are embedded in the magnetic arc (60F), and each pushing magnet (61F) has magnetic lines as shown. With the force of the pushing magnets (61F), the weights (30F) passing the magnetic arc (60F) are forced to move toward the rotor body (10F). Because of principles of leverage, the rotor body (10F) is forced to rotate clockwise continuously. An adjusting screw (62F) is connected to the magnetic arc (60F) to adjust the distance between the magnetic arc (60F) with the columns (20F) so that the magnetic force is changed to adjust the rotating speed of the rotor body (10F).

Figure 11:
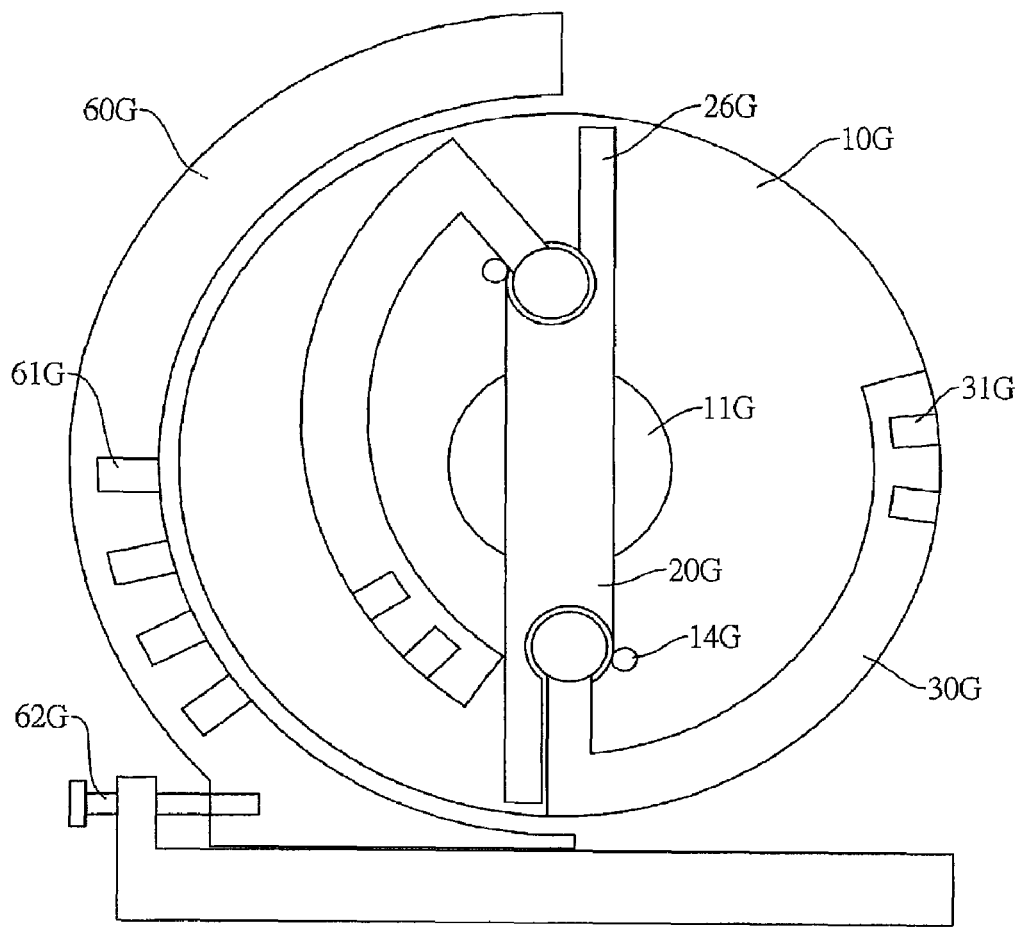
FIG. 11 is a front view in partial section of a gravitational-magnetic levitation rotor in accordance with the present invention.

With reference to FIG. 11, a gravitational-magnetic levitation rotor in accordance with the present invention has a column (20G) being mounted through the rotor body (10G). Two weights (30G) are respectively mounted pivotally on the ends of the column (20G). Each weight (30G) is an arc and has at least one inner magnet (31G) being embedded in the distal end of each weight (30G). The rotor body (10G) has two inner stops (14G) being mounted relative to the inner edges of the weights (30G). The column (20G) has two outer stops (26G) being formed respectively on the ends thereof. The inner and outer stops (14G, 26G) selectively abut the corresponding weight (30G) to limit the pivoting path of the weights (30G). The adjusting screw (62G) is provided to adjust the position of the magnetic arc (60G).

Figure 12:
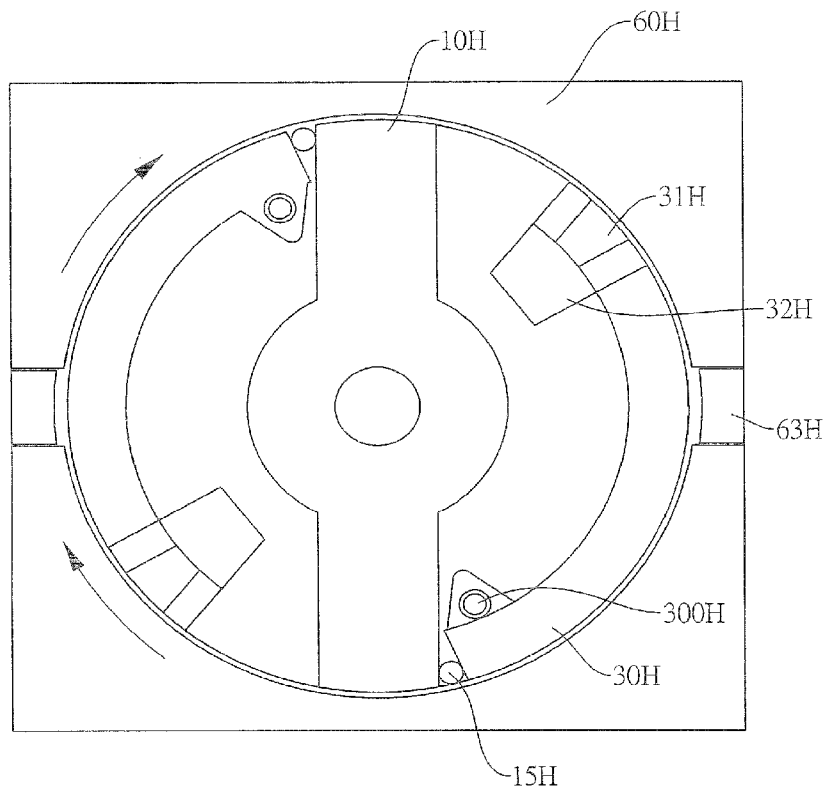
FIG. 12 is a front view in partial section of a gravitational-magnetic rotor in accordance with the present invention.

With reference to FIG. 12, a gravitational-magnetic levitation rotor in accordance with the present invention has a magnetic ring (60H) being mounted around the rotor body (10H) and the two weights (30H). The weights (30H) are arcs and are mounted pivotally on the rotor body (10H). Each weight (30H) has at least one inner magnet (31H) and a ballast (32H) being mounted on a distal end thereof. The rotor body (10H) has two resilient stops (15H) being mounted respectively relative to the outer edges of the weights (30H). The rotor body (10H) is rotated by the centrifugal force of the weights (30H) and the magnetic attracting force between the magnetic ring (60H) and the inner magnets (31H). The ballast (32H) enhances the centrifugal force to keep the rotor body (20H) rotating longer. The magnetic ring (60H) has two gaps. Two actuating plugs (63H) are mounted detachably in the gaps. When the actuating plugs (63H) are detached from the magnetic ring (60H), the magnetic force provided by the magnetic ring (60H) is broken. Then, the rotor body (10H) slows down until its stops. When the actuating plugs (63H) are inserted into the gaps of the magnetic ring (60H), the magnetic force of the magnetic ring (60H) is revived to rotate the rotor body (10H).

Figure 13:
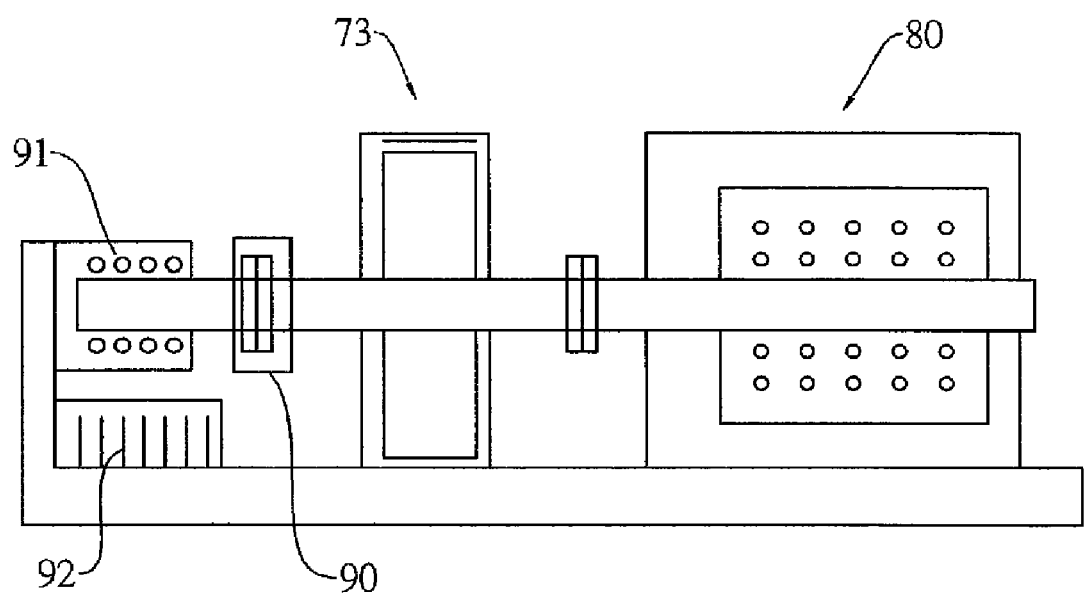
FIG. 13 is an operational view of a generating set in accordance with the present invention with the rotor in FIG. 12.

With reference to FIG. 13, a generating set in accordance with the present invention has the gravitational-magnetic rotor (73) as described. A motor (91) with a rechargeable battery is connected to a speed-change gear group (90) to transfer the high output speed from the motor (91) to medium or low output speed from the speed-change gear group (90). Then the gravitational-magnetic rotor (73) is switched on to actuate the generator (80). The output speed of the motor (91) is adjustable to change the generating effect of the gravitational-magnetic rotor (73).

The rotors as described may connect to power sources to get the initial power and may cooperate with other non-polluting generators to enhance their generating effect. Therefore, rotors and the generating sets as described are energy saving and generate power in a non-pollution way.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A physical energy-converting rotor comprising:
a rotor body; and
multiple weights being connected to the rotor body and being rotated with the rotor body, wherein,
when the rotor body is rotated, an inner virtual orbit and an outer virtual orbit are defined, and the weights are moved back and forth in the inner and outer virtual orbits by a force action-at-distance to form non-balances.

2. The rotor as claimed in claim 1 further comprising multiple hollow columns being mounted in the rotor body, wherein each weight is mounted movably in a corresponding column.

3. The rotor as claimed in claim 2, wherein each column has a buffering pad being mounted therein.

4. The rotor as claimed in claim 2, wherein each column is parallel with a corresponding radius of the rotor body.

5. The rotor as claimed in claim 2, wherein each column is perpendicular with a corresponding radius of the rotor body.

6. The rotor as claimed in claim 4 further comprising an actuating magnet being mounted outside the rotor body.

7. The rotor as claimed in claim 5 further comprising an actuating magnet being mounted outside the rotor body.

8. The rotor as claimed in claim 4, wherein
each column has a magnetic buffer being mounted at a distal end thereof;
the weights are magnets that are attracted by the magnetic buffers; and
at least one actuating magnet is mounted outside the rotor body to form repulsion with the weights.

9. The rotor as claimed in claim 1 further comprising multiple supports extending out from the rotor body;
multiple hollow columns respectively corresponding to the supports, being attached securely to distal ends of the supports and forming a virtual rotating orbit, and each column has a magnetic buffer being mounted at a distal end thereof;
each weight is mounted movably in a corresponding column; and
a stationary magnet is mounted outside the virtual rotating orbit of the columns and forms repulsion with the magnetic buffers.

10. The rotor as claimed in claim 9, wherein each column is parallel with the corresponding support.

11. The rotor as claimed in claim 9, wherein each column is perpendicular with the corresponding support.

12. The rotor as claimed in claim 1 further comprising multiple solid columns protruding out of the rotor body, wherein
each weight is magnet and is mounted slidably around a corresponding column; and
at least one actuating magnet is mounted outside the rotor body.

13. The rotor as claimed in claim 12, wherein
each column has
a connecting column protruding out from the rotor body; and
a mounting column being connected to the connecting column and being perpendicular with a corresponding radius of the rotor body; and
each weight is mounted slidably around the mounting column of the corresponding column.

14. The rotor as claimed in claim 1 further comprising multiple solid columns protruding out of the rotor body, wherein
each weight is magnet and is mounted slidably around a corresponding column; and
a magnetic arc is mounted outside the columns, corresponds to part of a periphery of the rotor body and has multiple pushing magnets being mounted therein.

15. The rotor as claimed in claim 12 further comprising multiple springs, wherein each spring is mounted around a corresponding column and abuts a corresponding weight.

16. The rotor as claimed in claim 13 further comprising multiple springs, wherein each spring is mounted around the mounting column of a corresponding column and abuts a corresponding weight.

17. The rotor as claimed in claim 14 further comprising multiple springs, wherein each spring is mounted around a corresponding column and abuts a corresponding weight.

18. The rotor as claimed in claim 1 further comprising multiple solid columns protruding out of the rotor body, wherein
each weight is an arc being connected pivotally to a corresponding column and has at least one inner magnet being mounted therein; and
a magnetic arc is mounted outside the weights.

19. The rotor as claimed in claim 18, wherein the magnetic arc corresponds to part of a periphery of the rotor body.

20. The rotor as claimed in claim 1, wherein
each weight is an arc being connected pivotally to the rotor body and has at least one inner magnet and a ballast being mounted therein;

a magnetic ring is mounted outside the weights and has two gaps; and two actuating plugs are detachably mounted in the gaps.

21. A generating set with at least one physical energy-converting rotor as claimed in claim 1 comprising a generator being connected to the at least one physical energy-converting rotor.

22. The generating set as claimed in claim 21 further comprising a speed-change gear group being connected to the physical energy-converting rotor and the generator.

23. The generating set as claimed in claim 22 further comprising a motor being connected to the physical energy-converting rotor to provide initial power.

24. A rotating method for a physical energy-converting rotor comprising acts of:

providing a rotor body;

providing multiple weights being connected to the rotor body;

providing the rotor body an initial power to start rotating;

forming an inner virtual orbit and an outer virtual orbit by the rotating rotor body, wherein when the weights are rotated with the rotor body, the weights are moved back and forth in the inner and outer virtual orbits by a force action-at-distance to form non-balances.

* * * * *